United States Patent
Zanotti (10) Patent No.: US 11,174,939 B2
(45) Date of Patent: Nov. 16, 2021

(54) TRANSMISSION ASSEMBLY WITH ORDINARY GEAR TRAIN AND VERTICAL OUTPUT AXIS

(71) Applicant: ROSSI S.P.A., Modena (IT)

(72) Inventor: Vittoriano Zanotti, Carpi (IT)

(73) Assignee: ROSSI S.P.A., Modena (IT)

( * ) Notice: Subject to any disclaimer, the term of this patent is extended or adjusted under 35 U.S.C. 154(b) by 0 days.

(21) Appl. No.: 16/979,790

(22) PCT Filed: Mar. 8, 2019

(86) PCT No.: PCT/EP2019/055898
§ 371 (c)(1),
(2) Date: Sep. 10, 2020

(87) PCT Pub. No.: WO2019/175060
PCT Pub. Date: Sep. 19, 2019

(65) Prior Publication Data
US 2021/0041017 A1    Feb. 11, 2021

(30) Foreign Application Priority Data
Mar. 13, 2018  (IT) .................. 102018000003467

(51) Int. Cl.
*F16H 57/04* (2010.01)
*F16H 1/20* (2006.01)

(52) U.S. Cl.
CPC .......... *F16H 57/0424* (2013.01); *F16H 1/20* (2013.01); *F16H 57/045* (2013.01); *F16H 57/0436* (2013.01); *F16H 57/0471* (2013.01)

(58) Field of Classification Search
CPC .......... F16H 1/20; F16H 57/021; F16H 57/04; F16H 57/0424; F16H 57/0436; F16H 57/045; F16H 57/0471
See application file for complete search history.

(56) References Cited

U.S. PATENT DOCUMENTS

| 4,147,071 A * | 4/1979 | Scribner .................. F16H 1/20 |
| | | 409/146 |
| 4,658,665 A * | 4/1987 | Strinzel ............... F16H 57/0442 |
| | | 184/6.12 |

(Continued)

FOREIGN PATENT DOCUMENTS

EP    0657249 A1    6/1995
EP    1118784 A1    7/2001

(Continued)

OTHER PUBLICATIONS

Machine translation of EP 1118784 A1 obtained on Jan. 4, 2021.*

(Continued)

*Primary Examiner* — Adam D Rogers
(74) *Attorney, Agent, or Firm* — Scully, Scott, Murphy & Presser, P.C.

(57) ABSTRACT

A transmission assembly with ordinary gear train and vertical output axis, which comprises a substantially box-like body for the accommodation and rotational support of an ordinary gear train with a vertical output axis which comprises at least one shaft with substantially vertical arrangement having at least one portion accommodated inside the body and supported so that it can rotate at least by first and second rolling elements, of which at least the second rolling elements are accommodated inside the body and are arranged above the first rolling elements; a lubricant liquid accumulation chamber, associated inside the body and is adapted to accommodate, at least partially immersed in the bath of liquid inside it, at least the second rolling elements of the at least one shaft with substantially vertical arrangement, the shaft being inserted into the chamber so as to pass through hermetically.

15 Claims, 6 Drawing Sheets

(56) References Cited

U.S. PATENT DOCUMENTS

| | | | |
|---|---|---|---|
| 7,506,558 B2* | 3/2009 | Haga | F16H 57/0006 |
| | | | 74/331 |
| 9,266,705 B2* | 2/2016 | Kanna | B60K 7/0007 |
| 9,671,008 B2* | 6/2017 | Minaminakamichi | F04C 2/10 |
| 9,835,242 B2* | 12/2017 | Itoo | F16D 11/14 |
| 2006/0231337 A1* | 10/2006 | Vogeltanz | F16N 7/36 |
| | | | 184/6 |
| 2015/0159697 A1* | 6/2015 | Fischer | F16C 33/664 |
| | | | 384/462 |

FOREIGN PATENT DOCUMENTS

| | | | | |
|---|---|---|---|---|
| JP | S54-161871 U | 11/1979 | | |
| WO | WO-2019049800 A1 * | 3/2019 | | F16N 9/02 |
| WO | WO-2019054322 A1 * | 3/2019 | | F16C 33/66 |

OTHER PUBLICATIONS

International Search Report and Written Opinion dated May 21, 2019 issued in PCT/EP2019/055898.

Italian Search Report and Written Opinion dated Oct. 30, 2018 issued in IT 201800003467, with partial translation.

\* cited by examiner

TRANSMISSION ASSEMBLY WITH ORDINARY GEAR TRAIN AND VERTICAL OUTPUT AXIS

The present invention relates to a transmission assembly with ordinary gear train and vertical output axis.

Applications are known in which, for the transmission of rotary motion between a drive engine and a follower element, a transmission assembly with an ordinary gear train is used, in which the output shaft is positioned with a vertical arrangement, protruding upward or downward.

Such applications are widespread, for example, in the field of condensers, mixers, stirrers or in cooling towers.

Conventional transmission assemblies substantially comprise a box-like body or casing for accommodating and rotationally supporting at least one reduction stage which comprises a gear set interposed between an input shaft and a vertical output shaft, the input shaft also capable of having a vertical or a different arrangement.

If there are at least two reduction stages with respective gear sets, then at least one intermediate shaft is provided which supports two pinions, each one belonging to a respective gear set.

Each vertical shaft is supported so that it can rotate by an upper bearing and by a lower bearing which are accommodated in respective seats defined inside the box-like body.

Furthermore, a lubricant oil collection sump is defined in the lower part of the box-like body, in which the lower bearings for supporting the vertical shafts and one or more of the lower gear sets of the transmission assembly can be at least partially immersed.

For the lubrication of the gear sets and of the upper bearings, several solutions are known.

A first conventional solution entails a system of forced circulation of the oil which, by way of a rotary pump immersed in the collection sump and a plurality of ducts, is distributed toward the gear sets and the upper bearings of the vertical shafts. The pump is generally keyed on the input shaft and is, therefore, actuated by the rotation of the shaft. Such ducts can be accommodated at least partially outside the box-like body or they can be completely accommodated inside the body.

Alternatively, a solution is known in which a plurality of channels in the upper lid of the box-like body are supplied by the pump, and these channels distribute the oil toward a plurality of openings arranged at the bearings and at the gear sets, from which the oil falls, lubricating such elements.

All these conventional solutions are not devoid of drawbacks, among which is the fact that when the motor coupled to the transmission assembly stops, the oil circulation pump stops working and the distribution ducts/channels are emptied, such that during ignition transients there is substantially no lubrication of the gear sets and of the upper bearings of the vertical shafts, until the circuit fills up again, with consequent inefficiencies and the risk of damage to the components.

Such drawback has an even greater impact in situations in which the transmission assembly is installed in a low-temperature environment, such that the greater density of the oil slows the filling of the circuit and, therefore, lengthens the ignition transient. In such conditions of operation, auxiliary systems can be provided for heating the oil, which complicate the structure of the transmission assembly and increase its weight, bulk and production costs.

Furthermore, in the event of an outage of the oil circulation pump, such conventional solutions entail a total absence of lubrication of the elements that are not immersed in the collection sump.

Also, the fact that the pump must continuously dispense a flow of oil that is such as to continuously supply the various ducts entails an absorption of power, a level of noise and a heating of the oil that rises with the increase of the flow.

Last but not least, given the substantially constant fill level of the collection chamber, if one or more of the lower gear sets are touched by the oil, splashing phenomena arise which contribute to the heating of the oil for the entire operation of the transmission assembly.

The aim of the present invention is to eliminate the above mentioned drawbacks in the background art by providing a transmission assembly with ordinary gear train and vertical output axis that makes it possible to ensure an at least partial lubrication of the elements that are not immersed in the oil bath present on the bottom of the casing, even during ignition transients, in order to optimize the performance and preserve the integrity of the components of the assembly.

Within this aim, an object of the present invention is to provide a transmission assembly that makes it possible to ensure such at least partial lubrication independently of the conditions of operation (ambient temperature), without needing to provide auxiliary systems for heating the oil and even in the event of an outage of the pump.

Another object of the present invention is to not lead to losses of power of the hydraulic circuit owing to the operation of the pump, and to contain the noise level during the operation thereof and to reduce the heating of the oil.

A further object of the present invention is to provide a transmission assembly that under normal running conditions, prevents phenomena of splashing of the oil, thus further reducing the heating thereof.

Another object of the present invention is to favor the heat exchange between the oil circulating inside the transmission assembly and the outside environment, in order to facilitate its cooling, while optimizing its lubricant power and increasing its lifetime before replacement.

Last but not least, another object of the present invention is to provide a simple structure which is easy and practical to implement, safe in use and effective in operation, and at low cost.

This aim and these objects are achieved by the present transmission assembly with ordinary gear train and vertical output axis, which comprises a substantially box-like body for the accommodation and rotational support of an ordinary gear train with a vertical output axis which comprises at least one shaft with substantially vertical arrangement having at least one portion accommodated inside said body and supported so that it can rotate at least by first and second rolling elements, of which at least the second rolling elements are accommodated inside said body and are arranged above the first rolling elements, characterized in that it comprises a lubricant liquid accumulation chamber, which is associated inside said body and is adapted to accommodate, at least partially immersed in the bath of liquid inside it, at least the second rolling elements of said at least one shaft with substantially vertical arrangement, said shaft being inserted into said chamber so as to pass through hermetically.

Further characteristics and advantages of the present invention will become better apparent from the detailed description of a preferred, but not exclusive, embodiment of a transmission assembly with ordinary gear train and vertical output axis, which is illustrated for the purposes of non-limiting example in the accompanying drawings wherein.

With particular reference to the figures, the reference numeral 1 generally designates a transmission assembly with ordinary gear train and vertical output axis.

The assembly 1 comprises a substantially box-like body 2 for the accommodation and rotational support of an ordinary gear train with a vertical output axis, which comprises at least one shaft with substantially vertical arrangement having at least one portion accommodated inside the body and supported so that it can rotate at least by first and second rolling elements, of which at least the second rolling elements are accommodated inside the body and are arranged above the first rolling elements.

According to the invention the assembly 1 comprises a lubricant liquid L accumulation chamber 11, the lubricant liquid L being of the type of oil, which is associated inside the body 2 and is adapted to accommodate, at least partially immersed in the bath of liquid L inside it, at least the second rolling elements of the at least one shaft with substantially vertical arrangement, the shaft being inserted into the chamber so as to pass through hermetically.

The fact that the at least one shaft with substantially vertical arrangement is inserted into the accumulation chamber so as to pass through hermetically makes it possible to always keep the lubricant liquid L present inside it so that the corresponding second rolling elements are always partially immersed inside it.

In more detail, the at least one shaft with substantially vertical arrangement is inserted so as to pass through a corresponding opening defined in the bottom wall of the accumulation chamber by way of interposition of sealing elements so as to prevent the outflow of liquid L through the opening.

Preferably, but not necessarily, the first rolling elements of the at least one shaft with substantially vertical arrangement are also accommodated inside the body 2.

As better described below, such shaft with substantially vertical arrangement, having the second rolling elements at least partially immersed in the bath of liquid L, which is provided in the accumulation chamber 11, can be the vertical output shaft of the gear train and/or the input shaft (if vertical) and/or one or more of the intermediate shafts (if there are at least two reduction stages of the gear train and the corresponding intermediate shafts are vertical).

In this manner the second rolling elements of the at least one shaft with substantially vertical arrangement of the gear train are always lubricated, irrespective of the conditions of operation of the assembly 1.

Preferably the level of the bath of liquid L contained inside the accumulation chamber 11 is such as to keep completely immersed the second rolling elements of the at least one shaft with substantially vertical arrangement of the gear train.

In the embodiment shown, the accumulation chamber 11 is provided as a single compartment, but the possibility is not ruled out that it can be made up of several spaces in mutual communication.

In more detail the body 2 has a substantially prismatic shape structure and is comprised of a lower base 2a, an upper lid 2b, and a lateral surface 2c which is interposed between them to connect them.

The geometry and the dimensions of the body 2 can vary as a function of the specific application with which the assembly 1 is intended to be used and as a function of its configuration.

The body 2 is generally composed of two or more parts which are mutually connected.

In particular, in the embodiment shown, the lid 2b can be associated removably over the lateral surface 2c and the latter surface is provided externally with ribs 3 in order to facilitate the heat exchange, but alternative embodiments of the body 2 are not ruled out.

Furthermore, the ordinary gear train of the assembly 1 comprises an input shaft 4 which has at least one portion 4a that is supported so that it can rotate inside the body 2; an output shaft 5 with substantially vertical arrangement, which has at least one portion 5a accommodated inside the body 2 and supported so that it can rotate at least by first and second rolling elements 6 and 7, of which at least the second rolling elements 7 are accommodated inside the body 2 and are arranged above the first rolling elements 6; and at least one reduction stage which comprises a gear set 8 provided with a driving gear 9 and with a transfer gear 10, which is interposed between the input shaft 4 and the output shaft 5.

In use the input shaft 4 is adapted to be mated with means for rotary actuation, of the type of a motor or the like, and the output shaft 5 is adapted to be mated with an assembly for rotary actuation.

The first and second rolling elements 6 and 7 of the output shaft 5 are typically constituted by respective conventional rolling bearings.

The transfer gear 10 of the last or sole reduction stage 8 provided in the gear train of the assembly 1 is keyed on the output shaft 5 in an intermediate longitudinal position between the rolling elements 6 and 7.

Preferably the second rolling elements 7 of the output shaft 5 are at least partially immersed in the bath of liquid L inside the accumulation chamber 11.

The possibility is not ruled out, however, that the second rolling elements 7 of the output shaft 5 can be grease-lubricated or in any case be arranged outside the accumulation chamber 11, by providing a different lubrication system.

The output shaft 5 has an end portion 5a accommodated inside the body 2 with one end 5b which protrudes inside the accumulation chamber 11 and is coupled to the second rolling elements 7, on the other side the shaft protruding from the base 2a of the body 2.

On the bottom of the accumulation chamber 11 there is a hole 12 for inserting the end 5b of the output shaft 5 and sealing means 13 are interposed, of the type of a rubber gasket, in order to prevent leaks of the liquid L.

The assembly 1 also comprises a lubricant liquid L collection sump 14 which is associated with the body 2, generally in a lower position than the accumulation chamber 11.

Preferably, the collection sump 14 is integral with the body 2, internally thereto, at the base 2a.

If the collection sump 14 is inside the body 2, it can accommodate the first rolling elements of the at least one substantially vertical shaft of the gear train of the assembly 1 at least partially immersed in the bath of liquid L inside it.

However further embodiments of the collection sump 14 are not ruled out, which can also be composed of a plurality of spaces in mutual communication, or be outside the body 2.

Conveniently, the assembly 1 comprises conventional pumping means 15, which have the intake and the outflow in fluid communication, respectively, with the collection sump 14 and with the accumulation chamber 11.

The intake of the pumping means 15 can be directly immersed in the collection sump 14.

In this case, pumping means 15 of the rotary type can be used, directly coupled to one of the shafts of the gear train for rotary actuation.

The outflow of the pumping means 15 is in communication with the accumulation chamber 11 by way of a duct 22.

Conveniently, the duct 22 extends inside the accumulation chamber 11 and ends at a height at least equal to the level of the liquid L contained inside it, so as to prevent leaks of that liquid through it when the pumping means 15 are not in operation. Alternatively, a one-way valve could be provided along the duct 22, or other retention elements, in order to prevent leaks of liquid L from the accumulation chamber 11 and maintain the level of liquid L inside it constant in the inactive condition.

In the shown embodiment, the input shaft 4 also has a substantially vertical arrangement and is therefore parallel to the output shaft 5.

The portion 4a accommodated inside the body 2 is supported so that it can rotate at least by first and second rolling elements 16 and 17, of which at least the second ones are accommodated inside the body.

The second rolling elements 17 are arranged above the first rolling elements 16 and are at least partially immersed in the bath of liquid L contained inside the accumulation chamber 11, the input shaft 4 being inserted inside the chamber so as to pass through hermetically.

The first and second rolling elements 16 and 17 are typically constituted by respective conventional rolling bearings.

The driving gear 9 of the first or sole reduction stage 8 provided in the gear train of the assembly 1 is keyed on the input shaft 4 in an intermediate longitudinal position between the rolling elements 16 and 17.

In more detail, the input shaft 4 is protruding above the lid 2b and has the portion 4a accommodated inside the body 2, which portion is inserted so that it passes through the lid 2b and the accumulation chamber 11, with one end 4b arranged in a lower region and an intermediate portion 4c at the accumulation chamber 11, which is coupled to the second rolling elements 17.

On the bottom of the accumulation chamber 11 there is a hole 18 for inserting the input shaft 4 and sealing means 19 are interposed, of the type of a rubber gasket, between the shaft and the internal wall of the hole 18 in order to prevent leaks of the liquid L.

Likewise the lid 2b is provided with a hole 20 for inserting the input shaft 4 and sealing means 21 are interposed, of the type of a rubber gasket, between the shaft and the internal wall of the hole 20.

The possibility is not ruled out, however, that the second rolling elements 17 of the input shaft 4 can be grease-lubricated or in any case be arranged outside the accumulation chamber 11, by providing a different lubrication system.

In the shown embodiment the first rolling elements 6 of the output shaft 5 are accommodated inside the body 2 and are lubricated with grease, as they are arranged outside the collection sump 14.

The first rolling elements 16 of the input shaft 4 are also accommodated inside the body 2 and are immersed in the bath of liquid L inside the collection sump 14, but the possibility is not ruled out that they can be lubricated according to a different lubrication method, optionally also with grease.

The pumping means 15 are preferably coupled to the input shaft 4, since it rotates at a higher speed, but the possibility is not ruled out that they can be coupled to a different shaft of the gear train of the assembly 1, or that they can have their own drive unit.

In addition, it is possible for the input shaft 4 to have an arrangement that is substantially perpendicular to, incident to or oblique with respect to the output shaft 5. In this case the rolling elements that support the input shaft 4 so that it can rotate can be lubricated using technologies known to the person skilled in the art.

Furthermore, the assembly 1 can have at least two reduction stages which comprise respective gear sets 8 interposed between the input shaft 4 and the output shaft 5, each one of which comprises a driving gear 9 and a transfer gear 10 which mutually mesh. In this case there is at least one intermediate shaft 23 which is interposed between the input shaft 4 and the output shaft 5 and is associated with the transfer gear 10 of one stage 8 and with the driving gear 9 of the next stage 8 and has at least one portion 23a supported so that it can rotate inside the body 2.

In the shown embodiment there are two reduction stages in series, which comprise respectively a first gear set 8 and a second gear set 8' and an intermediate shaft 23.

The first gear set 8 comprises a driving gear 9 coupled to the input shaft 4 and a transfer gear 10 coupled to the intermediate shaft 23. The second gear set 8' comprises a driving gear 9' coupled to the intermediate shaft 23 and a transfer gear 10 coupled to the output shaft 5.

The intermediate shaft 23 also has a substantially vertical arrangement and is, therefore, parallel to the input shaft 4 and the output shaft 5.

In this case the intermediate shaft 23 has the at least one portion 23a accommodated inside the body 2 and supported so that it can rotate at least by first and second rolling elements 24 and 25, of which at least the second rolling elements 25 are accommodated inside the body, the second rolling elements 25 being arranged above the first rolling elements 24 and being at least partially immersed in the bath of liquid L contained inside the accumulation chamber 11 and the intermediate shaft 23 being inserted into that chamber so as to pass through hermetically.

The first and second rolling elements 24 and 25 are typically constituted by respective conventional rolling bearings.

The transfer gear 10 of the first gear set 8 and the driving gear 9' of the second gear set 8' are keyed on the intermediate shaft 23 in an intermediate longitudinal position between the rolling elements 24 and 25.

In more detail, the intermediate shaft is completely accommodated inside the body 2 with an upper end 23b protruding inside the accumulation chamber 11 through a hole 26 with corresponding sealing means 27, of the type of a rubber gasket, interposed between the shaft and the internal wall of the hole 26 in order to prevent leaks of the liquid L through the hole.

The possibility is not ruled out, however, that the second rolling elements 25 of the intermediate shaft 23 can be grease-lubricated or in any case be arranged outside the accumulation chamber 11, by providing a different lubrication system.

Furthermore, the first rolling elements 24 of the intermediate shaft 23 are accommodated inside the body 2 and are immersed in the bath of liquid L contained inside the collection sump 14, but the possibility is not ruled out of their having a different lubrication method, including with grease.

The first gear set 8 is at a lower height than the second gear set 8'.

It should be noted that, should the input shaft 4 be perpendicular with respect to the output shaft 5, then at least one intermediate shaft of the gear train 1 could be parallel to the input shaft 4.

In addition, the gear train of the assembly 1 can have a different number of stages according to the requirements of the specific application.

The accumulation chamber 11 has a perimetric delimiting rim 28 and, inside it, at least one seat 29 for accommodating the second rolling elements at least partially immersed in the bath of liquid L inside it, which is delimited by a substantially annular wall protruding from its bottom.

The wall that defines the seat 29 could also be discontinuous and have two or more adjacent portions.

In the shown embodiment, in which there are three shafts 4, 5 and 23 with a vertical arrangement and all having the corresponding second rolling elements 7, 17 and 25 at least partially immersed in the bath of liquid L inside the accumulation chamber 11, there are three separate seats 29.

Furthermore, each seat 29 is provided with at least one slit 30 for the passage of liquid L toward the corresponding second rolling elements 7, 17, 25.

In addition, the height of the seats 29 is lower than that of the delimiting rim 28 so that the liquid L overflows into the seats in order to keep the second rolling elements 7, 17, 25 wet, the level of liquid L maintained inside the accumulation chamber 11 being always higher than the height of the seats 29.

In addition, the assembly 1 comprises at least one liquid L passage chamber 31, which is associated in fluid communication with the accumulation chamber 11 and has at least one outlet 32 for sending the liquid toward at least one of the gear sets of the gear train.

Preferably the passage chamber 31 is adjacent to the accumulation chamber 11 and is associated externally with the delimiting rim 28, which is provided with at least one spillway aperture 33 for the overflow of the liquid L from the accumulation chamber 11 to the passage chamber 31.

In the shown embodiment, there is a single passage chamber 31 which extends along a portion of the perimeter of the accumulation chamber 11, but the possibility is not ruled out of having several passage chambers which need not necessarily be mutually connected, but each one of which is connected to the accumulation chamber 11.

The passage chamber 31 is U-shaped in plan view, having two elongated wings on opposite sides of the reduction stages 8 and 8' and an intermediate connecting portion at which the aperture 33 is located.

At the aperture 33 on the bottom of the passage chamber 31, there is a sill 34 for the distribution of the liquid L toward the wings of the chamber.

The passage chamber 31 has two outlets 32, each one at a corresponding wing of the passage, which are associated with respective ducts 35 for routing the liquid to the gear sets 8 and 8'.

If the direction of rotation of the gear train is bidirectional for each gear set 8 and 8', then it is preferable to have two ducts 35 at the different zones of approach of the gears according to the direction of rotation.

At the outlets 32, the passage chamber 31 is deeper in order to increase the thrust exerted by the head of liquid L inside it on the liquid exiting from those openings through the corresponding ducts 35.

Finally the passage chamber 31 is in communication with at least one liquid L overflow pocket 36 so that the liquid flows down against the inside of the lateral surface 2c of the body 2 in order to facilitate the cooling of the liquid L during the return to the collection sump 14.

In the shown embodiment there are two pockets 36 at the ends of the elongated lengths of the passage chamber 31.

The liquid L fed by the pumping means 15 into the accumulation chamber 11 flows partially through the aperture 33 into the passage chamber 31 and, from this, into the pockets 36 toward the collection sump 14, so as to allow the refreshing and the cooling of the liquid.

Alternatively, in the absence of the passage chamber 31, there can still be at least one overflow pocket directly in fluid communication with the accumulation chamber 11, so that the liquid L fed by the pumping means 15 into the chamber flows partially through the pocket toward the collection sump 14, allowing a refreshing and a cooling thereof.

It should be noted that the flow-rate of liquid that needs to be dispensed by the pumping means 15 is rather contained, in that the outflow of reduced amounts of liquid into the accumulation chamber 11 is sufficient to obtain the circulation and the refreshing described above, as well as a sufficient lubrication of the gear sets 8, 8' only, in that the second rolling elements 7, 17, 25 are immersed in the liquid L content in the accumulation chamber 11.

Operation of the present invention is the following.

When the assembly 1 is in the inactive condition (FIGS. 2-3), i.e. the input shaft 4 is not rotationally actuated and the pumping means 15 are deactivated, then liquid L is contained in the accumulation chamber 11 up to a level L1 above the bottom of the chamber, which is lower than the height of the delimiting rim 28, but is at least equal to the height of the seats 29.

Figure 1:
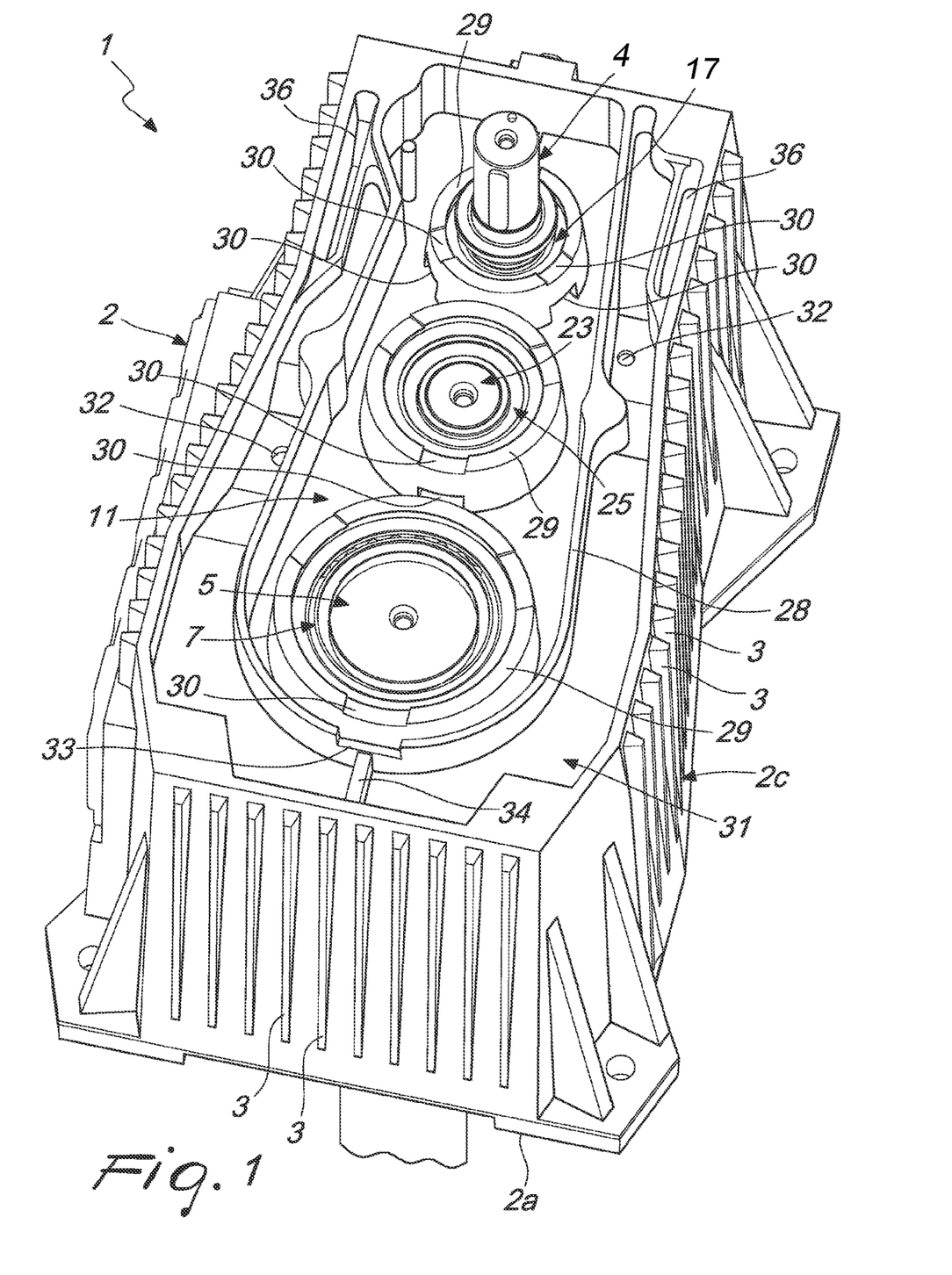
FIG. 1 is a perspective view of a transmission assembly with ordinary gear train and vertical output axis according to the invention, without the upper lid and without lubricant oil.
Figure 2:
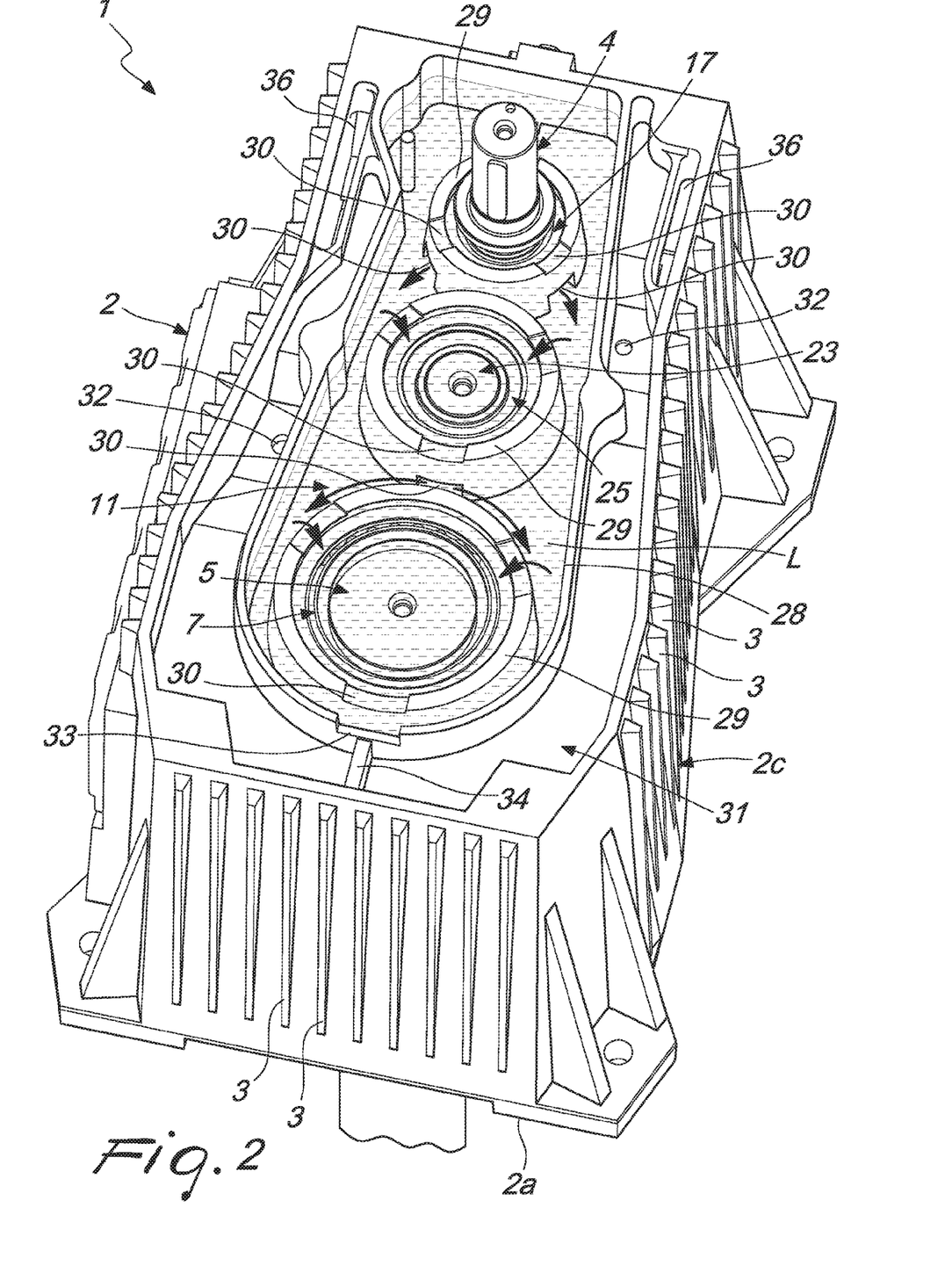
FIG. 2 is a perspective view of the transmission assembly in FIG. 1 in the inactive condition, i.e. with lubricant liquid present only in the accumulation chamber and in the collection sump.
Figure 3:
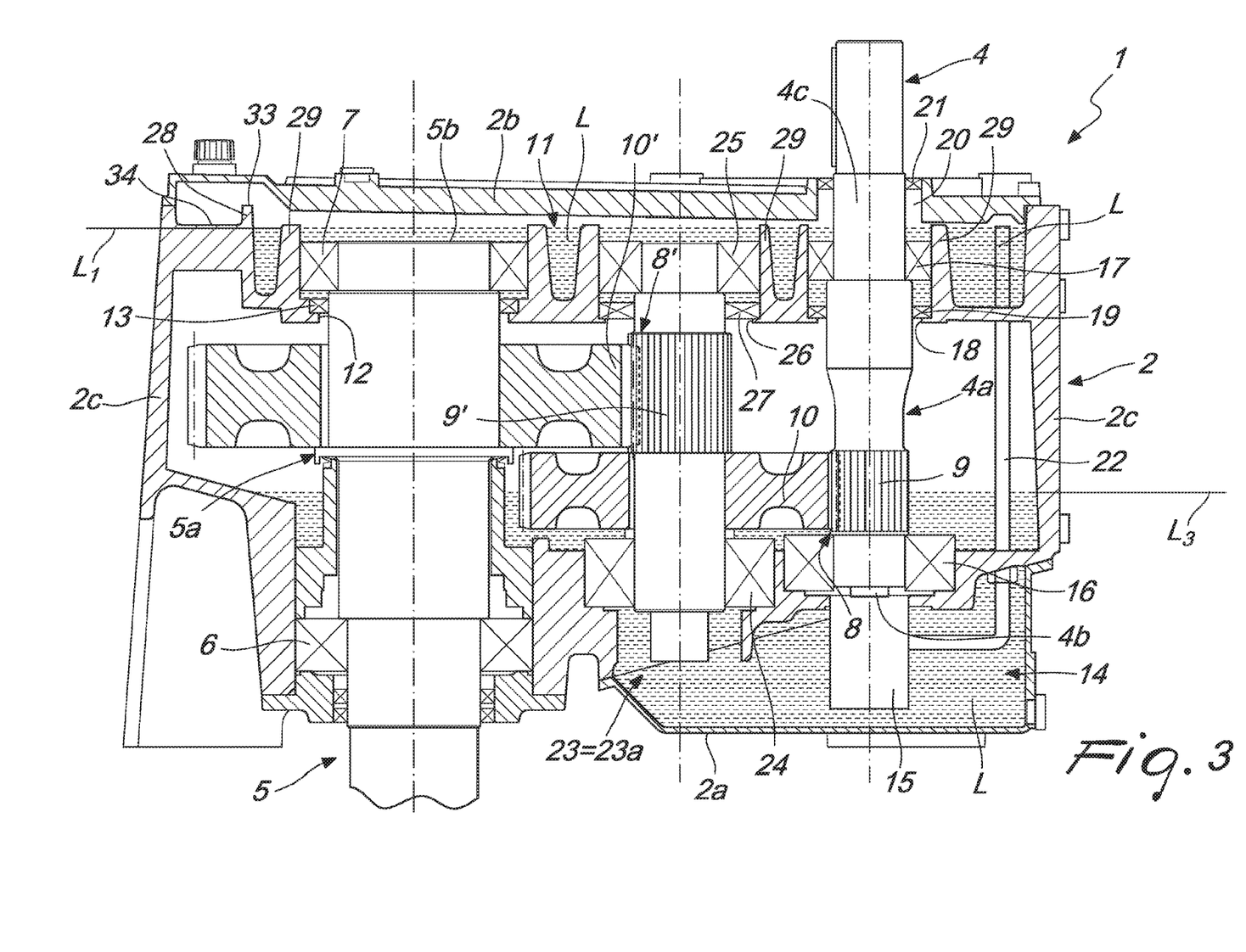
FIG. 3 is a longitudinal partial cross-sectional view in FIG. 2.

In this manner, the second rolling elements 7, 17 and 25 of the vertical shafts 4, 5 and 23 are always at least partially immersed, and more preferably completely immersed, in the bath of liquid L present in the accumulation chamber 11, independently of the actuation of the gear train and of the operation of the pumping means 15.

It should be noted that thanks to the sealing means 13, 19, 21 and to the extension of the duct 22 inside the accumulation chamber 11, leaks of liquid L from the chamber are avoided when the assembly 1 is inactive, so that the level L1 is kept constant over time.

In this condition, conveniently, the level L3 of liquid L contained in the collection sump 14 on the bottom of the body 2 is such as to strike at least the first gear set 8 and to keep the first rolling elements 16 and 24 immersed.

During the ignition transient, the rotation imparted to the input shaft 4 activates the operation of the pumping means 15, which begin supplying liquid L from the collection sump 14 toward the accumulation chamber 11, causing a progressive increase of the level of liquid L inside it and a progressive decrease of the level of liquid L present in the collection sump 14. Furthermore the rotation of the wheels 9 and 10 of the first gear set 8 causes the splashing of the liquid L contained in the collection sump 14, so as to lubricate the second gear set 8' as well, while liquid L begins to flow from the outlets 32 through the corresponding ducts 35 toward the gear sets 8 and 8'.

During normal running operation conditions (FIGS. 4-6), once the transient described above has ended, the liquid L present in the accumulation chamber 11 stabilizes at a level L2 which is at least equal to the height of the aperture 33, so as to also fill the passage chamber 31 and so as to continue flowing from this toward the pockets 36 in order to allow the refreshing and the cooling thereof.

Figure 4:
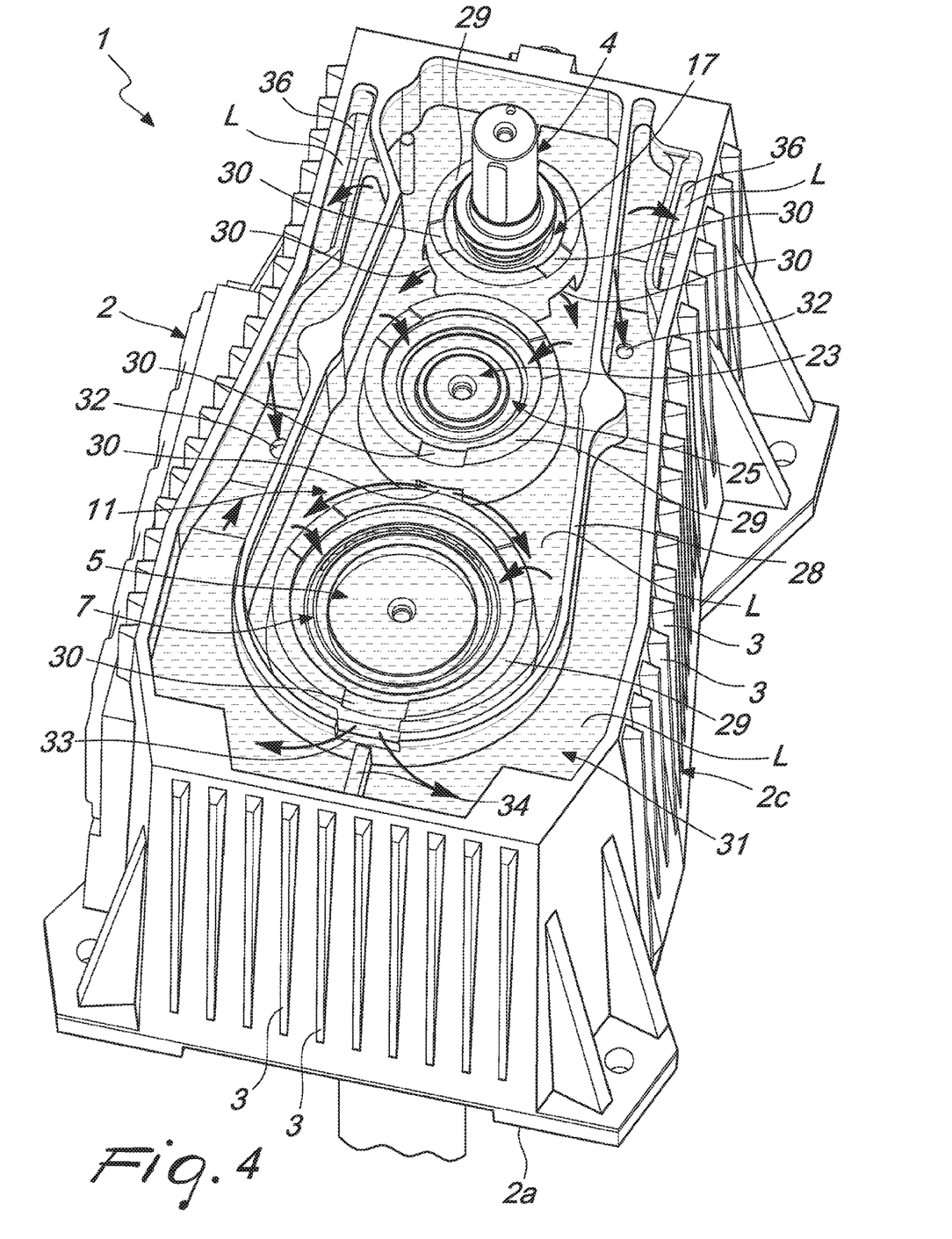
FIG. 4 is a perspective view of the transmission assembly in FIG. 1 in the active conditions, i.e. with lubricant liquid circulating between the collection sump, the accumulation chamber, the passage chamber and the overflow pockets.
Figure 5:
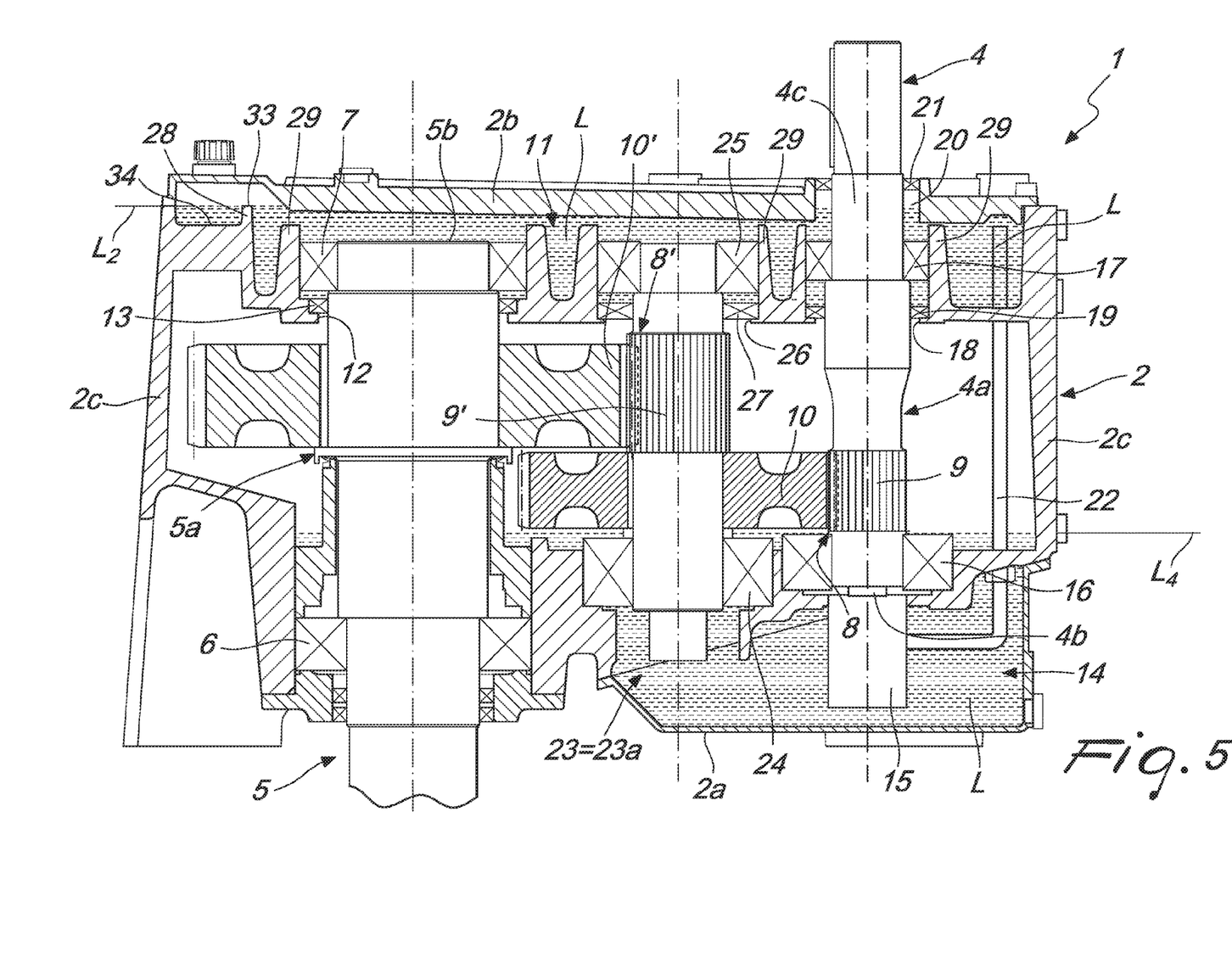
FIG. 5 is a longitudinal partially cross-sectional view in FIG. 4.
Figure 6:
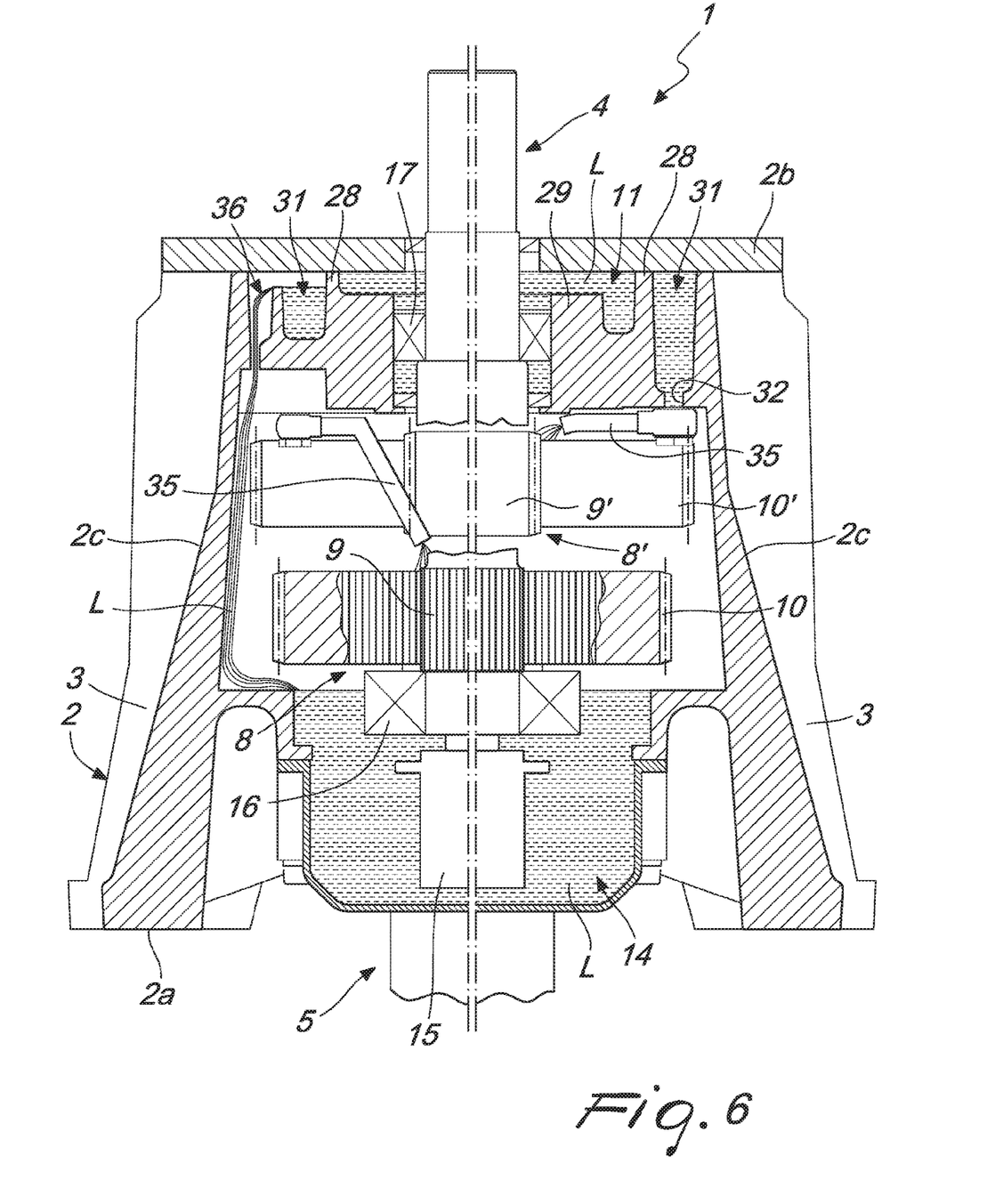
FIG. 6 is a transverse partial cross-sectional view in FIG. 4.

Furthermore the head of liquid L present in the passage chamber 31 at the outlets 32 enables the outflow from the corresponding ducts 35 of an amount of liquid L sufficient to lubricate the gear sets 8 and 8', even in the absence of splashing of the liquid L in the collection sump 14.

In fact, in the collection sump 14 the liquid L stabilizes at a level L4 situated below the first gear set 8, so as to prevent splashing phenomena from enduring, with consequent unwanted heating of the liquid L.

It should be noted that the height of the aperture 33 is substantially equal to the inner face of the lid 2b, so that a regime the surface of the liquid L contained in the accumulation chamber 11 internally laps against the lid, favoring the cooling of the liquid L.

In practice it has been found that the invention as described achieves the intended aim and objects and, in particular, attention is drawn to the fact that the assembly according to the invention makes it possible to maintain sufficiently lubricated at least the upper bearings of one or more vertical shafts of the gear train even with the motor switched off and independently of the operation of the oil circulation pump and of the environmental conditions.

Furthermore, the assembly according to the invention makes it possible to reduce the phenomena of splashing and, therefore, of unwanted heating of the lubricant oil.

Last but not least, the assembly according to the invention makes it possible to optimize the cooling of the lubricant oil so as to increase its efficacy and lifetime.

The invention thus conceived, is susceptible of numerous modifications and variations all of which are within the scope of the appended claims.

Moreover, all the details may be substituted by other, technically equivalent elements.

In practice the materials employed, as well as the contingent dimensions and shapes, may be any according to requirements without for this reason departing from the scope of protection claimed herein.

The disclosures in Italian Patent Application No. 102018000003467 from which this application claims priority are incorporated herein by reference.

The invention claimed is:

1. A transmission assembly, which comprises:
   a body for the accommodation and rotational support of a gear train;
   a vertical output axis which comprises at least one shaft with substantially vertical arrangement having at least one portion accommodated inside said body and supported so that the at least one shaft can rotate at least by a first rolling element and a second rolling element, of which at least the second rolling element is accommodated inside said body and is arranged above the first rolling element,
   a lubricant liquid accumulation chamber, which is inside said body and is adapted to accommodate, at least partially immersed in a bath of liquid inside said lubricant liquid accumulation chamber, at least the second rolling element of said at least one shaft with substantially vertical arrangement, said at least one shaft being inserted into said chamber so as to pass through hermetically, wherein said lubricant accumulation chamber comprises internally at least one seat for accommodating said second rolling element at least partially immersed in the bath of liquid inside said lubricant liquid accumulation chamber, and wherein said lubricant accumulation chamber comprises a perimetric delimiting rim; and
   at least one liquid passage chamber, which is in fluid communication with said lubricant accumulation chamber and has at least one outlet for sending liquid toward moving elements of said gear train, wherein said at least one liquid passage chamber is external to said delimiting rim, the delimiting rim being provided with at least one spillway aperture for the overflow of the liquid from the liquid accumulation chamber to the at least one liquid passage chamber.

2. The assembly according to claim 1, further comprising a liquid collection sump.

3. The assembly according to claim 2, further comprising at least one liquid overflow pocket so that said liquid flows down against the inside of a lateral surface of said body for a cooling of said liquid during a return to said liquid collection sump, which is in fluid communication with said liquid accumulation chamber.

4. The assembly according to claim 3, wherein said at least one liquid overflow pocket is in fluid communication with said liquid accumulation chamber through said at least one liquid passage chamber.

5. The assembly according to claim 2, wherein said liquid collection sump is arranged below said lubricant accumulation chamber.

6. The assembly according to claim 2, further comprising a rotary pump that comprises an intake and an outflow in fluid communication, respectively, with said liquid collection sump and said lubricant accumulation chamber.

7. The assembly, according to claim 6, wherein the intake of said rotary pump is immersed in said liquid collection sump.

8. The assembly according to claim 6, wherein said rotary pump is operably connected to one of said at least one shafts for rotary actuation.

9. The assembly according to claim 1, wherein said at least one seat is provided with at least one slit for the passage of liquid toward the second rolling element accommodated therein.

10. The assembly according to claim 1, wherein said delimiting rim is higher than said at least one seat.

11. The assembly according to claim 1, wherein said at least one outlet is arranged on the bottom of the liquid passage chamber.

12. The assembly according to claim 1, wherein said at least one shaft comprises an input shaft and an output shaft, wherein said gear train comprises the input shaft that is supported so that the input shaft can rotate inside said body; the output shaft with substantially vertical arrangement, which is at least partially accommodated inside said body and supported so that the output shaft can rotate at least by the first rolling element and the second rolling element, of which at least the second rolling element is accommodated inside said body, the second rolling element being arranged above the first rolling element and being at least partially immersed in the bath of liquid inside said accumulation chamber and the output shaft being inserted into said liquid accumulation chamber so as to pass through hermetically; and at least one reduction stage, which comprises a gear set provided with a driving gear and with a transfer gear which mutually mesh, which is interposed between said input shaft and said output shaft.

13. The assembly according to claim 12, further comprising at least two reduction stages which comprise respective gear sets which are interposed between said input shaft and said output shaft, each of which is provided with wherein said at least one shaft further comprises at least one intermediate shaft, wherein said at least one intermediate shaft is interposed between said input shaft and said output shaft and is between the transfer gear of one stage and with the driving gear of the next stage.

14. The assembly according to claim 13, wherein said at least one intermediate shaft is arranged with substantially vertical arrangement and is accommodated inside said body and is supported so that said at least one intermediate shaft can rotate at least by the first rolling element and the second rolling element, of which at least the second rolling element are accommodated inside said body, the second rolling element being arranged above the first rolling element and being at least partially immersed in the bath of liquid contained inside said liquid accumulation chamber and the at least one intermediate shaft being inserted into said liquid accumulation chamber so as to pass through hermetically.

15. The assembly according to claim 1, further comprising at least one reduction stage, which comprises a gear set, wherein said at least one outlet is operably connected to at least one duct for directing the liquid toward said gear set.

* * * * *